United States Patent [19]
Penberthy

[11] 4,299,611
[45] Nov. 10, 1981

[54] METHOD AND APPARATUS FOR CONVERTING HAZARDOUS MATERIAL TO A RELATIVELY HARMLESS CONDITION

[76] Inventor: H. Larry Penberthy, 631 S. 96th St., Seattle, Wash. 98108

[21] Appl. No.: 113,346

[22] Filed: Jan. 18, 1980

[51] Int. Cl.³ .......................... C03B 5/02; C03B 5/16
[52] U.S. Cl. ......................................... 65/27; 65/134; 65/135; 65/136
[58] Field of Search .................. 65/27, 134, 135, 136, 65/336

[56] References Cited

U.S. PATENT DOCUMENTS

| | | | |
|---|---|---|---|
| 3,245,769 | 4/1966 | Eck et al. | 65/27 |
| 3,397,972 | 8/1968 | Brichard et al. | 65/134 X |
| 3,573,940 | 4/1971 | Cockrell et al. | 65/27 X |
| 4,028,201 | 6/1980 | Rueck | 65/27 |
| 4,029,489 | 6/1977 | Froberg et al. | 65/135 X |
| 4,046,546 | 9/1977 | Hynd | 65/135 |

Primary Examiner—Ronald Serwin
Attorney, Agent, or Firm—Hughes, Barnard & Cassidy

[57] ABSTRACT

A glass material is directed into an elongate enclosed conversion chamber, where it is either converted to or maintained in a molten state by heating through the Joule effect. Waste material is directed onto the glass material at the inlet end of the conversion chamber, and sufficient oxygen is directed into the chamber to cause combustion of the waste material which is capable of being burned. A portion of the ashes created by combustion fall on the glass material and become a part thereof. The gaseous combustion products proceed horizontally through the elongate conversion chamber, and additional ash material suspended in the gaseous combustion products settles onto the glass material and also becomes a part thereof. The gaseous exhaust is directed through a plurality of ceramic fiber filter components which capture the small particulate material that remains suspended in the gaseous exhaust. These filter components are periodically discharged into the molten glass material to become a part thereof and/or to become oxidized. The glass material, with the other material added thereto, is periodically discharged to a cooling area to form a solidified product incorporating the ash product of the waste material.

20 Claims, 2 Drawing Figures

METHOD AND APPARATUS FOR CONVERTING HAZARDOUS MATERIAL TO A RELATIVELY HARMLESS CONDITION

BACKGROUND OF THE INVENTION

It has long been a practice to dispose of waste material by burning it in an incinerator. In many incinerators, there is a main combustion chamber, and it is common to use forced air to sustain combustion in the main chamber. Generally, the heat of combustion from the waste material is sufficient to sustain combustion, but in the event the incoming waste does not have enough combustible material or is too wet, it is common to add fuel, such as coke or wood chips.

Incinerators have long been noted for their offensive smoke and airborne ashes. Accordingly, many modern incinerators employ a second combustion chamber to complete the combustion. However, where the waste being burned in the main combustion chamber is not entirely burned, resulting smoke is sometimes a fuel gas. When the fuel gas mixes with additional air in the second chamber, there is the potential for an explosion if the pilot light is not on or if the temperature during start up is not high enough.

Another problem with prior art incinerators is that with the flow of gaseous exhaust proceeding upwardly in the incinerator, there is a tendency for small particulate material, whether completely burned or not, to be carried through both the first and second combustion chambers and be discharged to the atmosphere. This becomes troublesome particularly when the waste material being burned is contaminated, such as by radioactivity or some other source of contamination. Where full and forced air are used to sustain combustion, this problem is intensified since the additional inflow of air would tend to increase the velocity of gaseous flow through the combustion chambers and thus have a greater tendency to carry particulate matter out as exhaust.

Contaminated waste material can take a great variety of forms. Some of this material, such as various organic material, is combustible, while other material, such as metal oxides, is non-combustible. With regard to radioactive waste, the combustible material can be incorporated in more common objects such as clothing, cardboard or wood containers, rags, etc., or material such as the ion-exchange resin used in nuclear power plants. There are a wide variety of such resins, and these are used to purify the water which is used in nuclear power plants. During this action of purification, the resin picks up highly radioactive materials, such as cesium, chromium, iron and the like. These resins may also have picked up fission products from the nuclear reactions. While the ion-exchange resins are essentially organic in nature, the exact compositions are quite often proprietary and thus not publicly known. However these are generally combustible to a considerable degree, but may contain some non-combustible material, such as metal oxide.

Also, waste material may come in either solid or liquid form, with the liquid form being either organic or aqueous. An example of an organic liquid which may be waste material is toluene. Quite often when toluene is burned in an incinerator, it produces a black smoke, and it is necessary to burn the black carbon smoke particles in a secondary combustion chamber. Another form of liquid waste material is that class of materials known as polycholorinated biphenyls, hereinafter referred to as "PCB's". Included in this class of materials are many organic chemicals of a toxic nature, such as dioxin, which is exceedingly toxic and resists decomposition by thermal means up to a temperature of perhaps as high as 1470° F.

With regard to aqueous waste solutions, an example of these would be boric acid or sodium hydroxide. Also, such aqueous solutions could contain radioactive metal oxides.

In view of the foregoing, it is an object of my invention to provide a method and apparatus for converting waste material, and particularly hazardous waste material, to a relatively harmless condition.

It is a further object of my invention to provide such a method and apparatus that will handle a variety of combustible waste materials with substantially complete combustion by use of one combustion chamber.

It is yet another object to accomplish the above objects in a manner that substantially all or a relatively high proportion of the ash and dust residue resulting from combustion is captured and retained in a relatively harmless form.

These and other objects will become apparent from the following description.

SUMMARY OF THE INVENTION

In the method of the present invention, there is provided a glass material in an enclosed horizontally extending conversion chamber. The chamber comprises a rear breakdown area and a forward settling area spaced horizontally from the breakdown area. The glass in the conversion chamber is maintained in a molten condition in the lower part of the chamber.

The waste material is directed into the conversion chamber and onto the glass at the breakdown area. The glass material is maintained at a sufficiently high temperature to cause the waste material to be broken down into an ash component and a gaseous component, with at least some of the ash component being particulate ash suspended in the gaseous component.

The gaseous component is moved generallly horizontally from the breakdown area to a location over the molten glass material in the settling area. At least part of the suspended particulate ash settles onto the molten glass material in the settling area to form a combined waste-glass material. The combined waste-glass material is discharged to a cooling zone to form the waste-glass material into a solid waste-glass product.

In the preferred form, at least a portion of the waste material is combustible, and the method further comprises maintaining the glass material at a sufficiently high temperature and providing sufficient oxidizing gas to cause combustion of the combustible waste material to form at least a portion of the ash product. Also, in the preferred form, where there is metallic waste material the method further comprises providing an initial combustion area spaced from the breakdown area. The metallic portion of the waste material is directed into the initial combustion area, where it is oxidized to form metal oxides, which are then directed onto the molten glass material.

Desirably, the gaseous component is directed from the settling area through at least one filter component made of a filter material which can combined with the glass material. At least some of the suspended particulate ash is captured in the filter component. Then the filter component is discharged into the molten glass material to become incorporated therein. In the preferred form, there is a plurality of filter components arranged in series with one another, and the discharge means causes the filter components to be sequentially discharged into the molten glass material. Also the filter material can be partly or totally combustible, with a part or all of the filter material passing out as exhaust gas.

In the apparatus of the present invention, there is means defining an enclosed horizontally extending conversion chamber, with the rear breakdown area and the forward settling area spaced horizontally from the breakdown area. The chamber has a lower elongate portion adapted to contain the molten glass material and an upper portion adapted to contain the gaseous component.

There is rear inlet means leading into the breakdown area, adapted to direct the waste material and the glass material into the conversion chamber. There is forward discharge means adapted to discharge the combined wasteglass material from the settling area. Additionally, there is means to discharge the gaseous component from the settling area. Also, there is means to maintain the glass material in the conversion chamber at an adequately high temperature to cause break down in the breakdown area.

In the preferred form of the apparatus, there is a filter component in a discharge passageway for the gaseous component, and desirably there is a plurality of filter components arranged in series. There is discharge means adapted to discharge the one or more filter components into the molten glass so that the one or more filter components can be incorporated therein and/or be oxidized.

Other features of the present invention will become apparent from the following detailed description.

DETAILED DESCRIPTION OF THE PREFERRED EMBODIMENT

Figure 1:
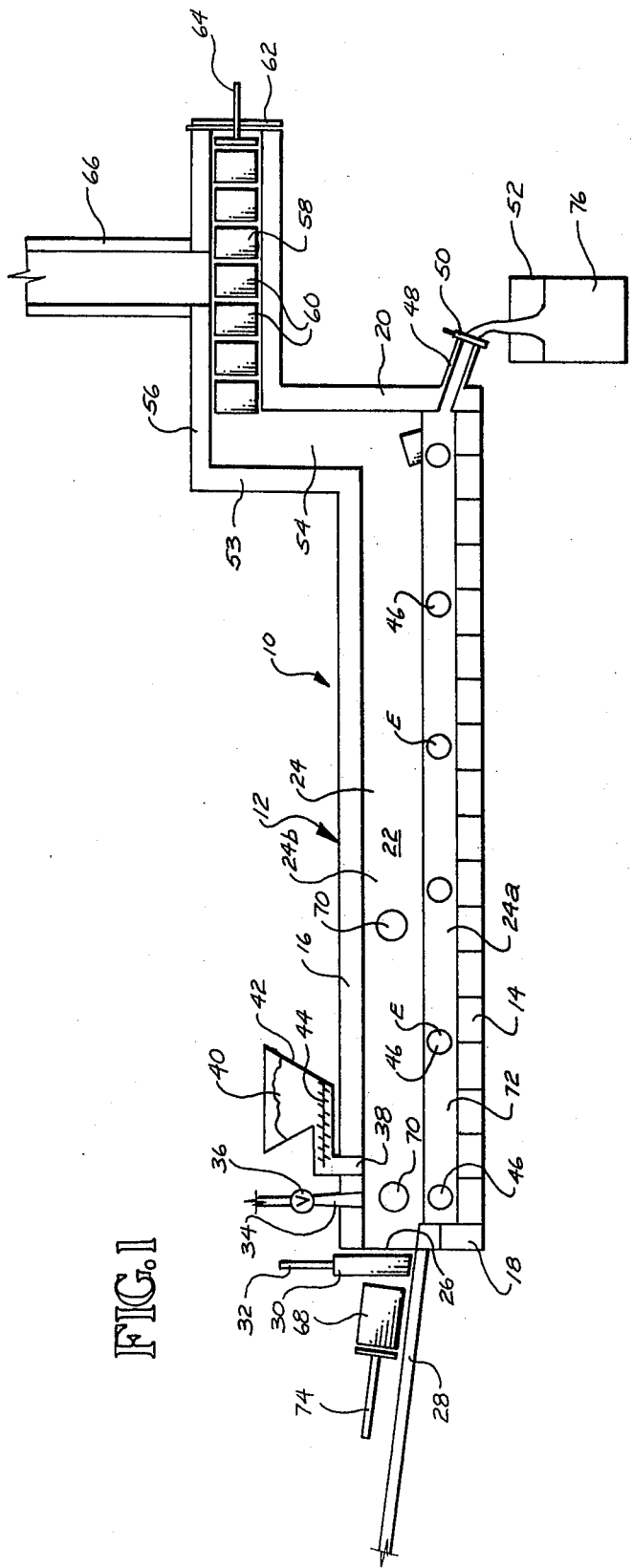
FIG. 1, is a longitudinal sectional view, showing somewhat schematically the apparatus of the present invention.

The apparatus 10 of the present invention comprises an elongate, horizontally extending containing structure 12, having a bottom wall 14, a top wall 16, a back wall 18, a front wall 20, and two side walls, one of which is shown at 22. The containing structure 12 defines an elongate conversion chamber 24, comprising a lower chamber portion 24a and an upper chamber portion 24b.

The bottom wall 14, and at least the lower portions of the back, front and side walls 18–22 are made of a glass-resistant refractory material so that a molten glass material can be retained in the lower portion 24a of the conversion chamber. The top wall 16 and the upper portions of the walls 18 through 22 can be made of a good quality fire clay brick.

There is a solid waste inlet opening 26 formed in the upper portion of the rear wall 18. A downwardly declining feed chute 28 leads to the opening 26, and a door 30, provided with actuating means shown schematically at 32 is provided to selectively close the opening 26. Also at the rear end of the structure 12, there is in the top wall 16 a liquid feed inlet 34 controlled by a valve 36, and also a glass inlet feed opening 38. Particulate glass material, such as crushed bottle glass, indicated at 40, is retained in a hopper 42 and selectively fed by a screw conveyor 44 into the feed opening 38 at the rear end of the containing structure 12.

One set of electrodes 46 (indicated by "E") are provided at spaced intervals along the entire length of the lower portion of one of the side walls 22, and a second set of matching electrodes are provided on the opposite side wall 22. The exact location and circuitry of the electrode can be modified as desired. In the operation of the present invention, current is directed between the two sets of electrodes to heat the glass in the lower portion 24a of the conversion chamber by the Joule effect, so as to maintain the glass in the chamber portion 24a in a molten condition.

At the front end of the structure 12, there is a discharge spout 48 at the lower end of the front wall 20, with the spout 48 being selectively closed or opened, for example, by a gate valve, indicated schematically at 50. Glass material that is discharged from the spout 48 is deposited in a cooling area, which as shown herein is a storage tank or drum 52.

Leading upwardly from the front discharge end of the structure 12 is a tubular wall structure 53 defining an exhaust passageway 54, the upper end of which communicates with a laterally extending filter structure 56 defining a horizontally extending filter area 58. Positioned in the filter area 58 is a plurality of porous filter blocks 60. In the preferred embodiment shown herein, these filter blocks 60 are made of ceramic fiber, which would be compatible with the glass contained in the lower portion 24a of the conversion chamber.

The forward end of the filter area 58 is closed by an airtight cover 62, and a pusher arm 64 extends through the airtight cover 62 in a manner to be able to engage the forwardmost one of the filter blocks 60. As will be disclosed hereinafter, periodically the pusher arm moves the filter blocks 60 rearwardly to push the rearmost block 60 downwardly through the exhaust passageway 54 and into the molten glass at the forward end of the lower conversion chamber portion 24a.

An exhaust flue 66 extends upwardly from the middle portion of the filter structure 56 to receive the gaseous exhaust that passes through the filter area 58. This exhaust flue 66 can be connected to additional processing apparatus, which is or may be conventional in the prior art. For example, the exhaust gases that pass into the flue 66 could be passed through one or more spray chambers, through a demist chamber, and possibly through additional filters. Since such additional processing apparatus is not part of the present invention, it will not be shown or described herein.

The process of the present invention will now be described with reference to the conversion of hazardous or contaminated waste material which is combustible or at least partially combustible. However, it should be understood that within the broader aspects of the present invention, it would be possible to convert waste material which is totally non-combustible, and this will be described later herein.

In initially describing the process, let it be assumed that there is box 68 containing waste material, and that the waste material is a variety of organic items which are combustible, along with some metal oxides such as silica, iron oxide, calcium oxide, alumina, and the like, which are compatible with glass. Initially, the lower portion 24a of the conversion chamber 24 is charged with a quantity of glass material, which is brought to a molten state in some manner. Glass is a metallurgical term which can be defined as a siliceous product combined with alkaline and metal oxides to make a product which is generally vitreous if quenched fast enough. A typical final composition of glass is as follows:

|                  | %      |
|------------------|--------|
| $SiO_2$          | 35–70  |
| $Al_2O_3$        | 4–8    |
| $Na_2O$          | 1–8    |
| $K_2O$           | 0–1    |
| CaO              | 10–30  |
| MgO              | 0–10   |
| FeO              | 1–30   |
| Other            | 0–5    |

The molten glass is maintained at the desired operating temperature (e.g. between about 1900° to 2700° F., and desirably at about 2300° F.) by passing current between the two sets of electrodes 46. If the glass that is initially placed in the structure 12 is not molten, then one method of melting the glass would be to direct fuel and air through a plurality air vents 70 provided in the two side walls 22, and ignite the fuel in the upper portion 24b of the conversion chamber 24.

The glass material in the molten state in indicated at 72. When the glass 72 is at the desired temperature (e.g. 2300° F.), the box of waste material 68 is moved by suitable means, such as a pusher arm 74 down the chute 28, through the rear feed opening 26, and onto the rear portion of the molten glass bath 72. The combustible material, being lighter than the glass 72, floats on top of the glass 72 and immediately begins to burn, due to the high temperature maintained in the conversion chamber 24. Air is fed through the vents 70 so that combustion proceeds at the desired rate. Combustion of the waste material produces gaseous exhaust, such as carbon dioxide, and ash material. The ash in general consists of metal oxides, such as silica, iron oxide, calcium oxide, alumina, and the like. This ash material is compatible with glass, and the particles of ash drop onto the surface of the molten glass 72 and become a part thereof. However, some of the smaller particles of ash may remain suspended in the gaseous combustion products.

The gaseous combustion products proceed forwardly in a horizontal path through the upper portion 24b of the conversion chamber. As the gaseous combustion products proceed through the chamber 24, the smaller particles of ash settle out from the gaseous combustion product and descend onto the molten glass 72 to become a part of the glass material 72. Also, there is in the upper chamber portion 24b a reaction called "polish combustion" which is the final stages of combustion of the products which have not been previously oxidized in the rear portion of the conversion chamber 24.

In reviewing that part of the process of the present invention described above, it can readily be appreciated that the rear portion of the conversion chamber 24 can be considered as an initial material breakdown area where the combustible material is burned and the noncombustible material melts or breaks down in some manner. When combustible material is present, this first area can be considered as a combustion area. The forward portion of the chamber 24 can be considered as a settling area. In the breakdown area, substantially all (or at least the much greater proportion of) the combustible material undergoes combustion with the larger particles of ash settling onto the molten glass material 72. In the settling area, as indicated above, the smaller particles of ash or other particulate material descend onto the molten glass 72, and possibly some of these particles experience the final phases of combustion, which as indicated above is termed "polish combustion".

However, it is possible that some of the quite small particulate material might be carried up the exhaust passageway 54. The gaseous exhaust passing upwardly through the passageway 54 moves through the filter blocks 60 in the filter area 58, and then passes out the flue 66. Substantially all (or at least a very substantial proportion) of the particulate material is captured in the filter blocks 60, with a large portion of the particulate material being captured in the rearmost block 60. If desired, the fibers or surface area of the filter blocks 60 can be provided with a proper surface coating to cause the particles to adhere to the fibre material.

When the rearmost filter block 60 becomes clogged or nearly saturated with particulate material, the pusher arm 64 is actuated to move the filter blocks 60 rearwardly so that the rearmost block 60 drops into the forward portion of the molten glass 72. The filter block 60 is desirably made of a ceramic material which is compatible with the glass material, so that the filter material melts and in effect becomes a part thereof, as does the ash material captured in the block 60. However, within the broader aspects of the present invention, the filter block could be made partly or all as a combustible material. When the block is then discharged onto the glass it forms ash and/or gaseous exhaust.

At periodic intervals, the gate valve 50 is opened to permit the molten glass material 72 to pass into the cooling area (as shown herein a tank 52). The molten glass, with the contaminated ash therein, solidifies into a block, indicated at 76, with the contaminants being safely incorporated therein. The block 76 can be then removed to storage or disposed of at some site which is remote from human activity.

It is contemplated that within the scope of the present invention, various kinds of hazardous or contaminated liquid can be converted by the present invention. These liquid materials can be contaminated, for example, with a variety of metal oxides which could readily be incorporated into the glass material 72.

An example of one liquid waste is toluene which, as indicated previously, burns with air to produce a black smoke. The toluene is introduced through the opening 34, and initial combustion of the toluene takes place in the rear part of the chamber 24. The partially oxidized combustion products proceed forwardly through the forward portion of the conversion chamber 24, where combustion is substantially completed.

As indicated previously, an example of a liquid waste material which has become particularly problematical, is PCB (polychorinated biphenyl).

When the PCB is to be processed by the present invention, it is passed through the liquid feed opening into the rear combustion area of the chamber 24. The PCB breaks down in the presence of air or oxygen at high temperature to form carbon dioxide, water vapor, and hydrogen chloride. With regard to any ash residue, this is, as indicated previously, incorporated into the molten glass material 72. The gaseous exhaust passing through the flue 66 can be discharged into the atmosphere. However, if it is desired to remove, for example, the hydrogen chloride, the gaseous exhaust could be subjected to subsequent processing, such as being passed through water spray chambers and filters, in a manner well known in the prior art.

In the event that the liquid waste material is a water solution containing, for example, boric acid or sodium hydroxide, the water evaporates and passes through the system as vapor. The solids content of the aqueous liquid waste then are deposited on the surface of the glass material 72, where they become part of the molten glass 72. It is desirable to maintain some reasonable composition of the molten glass with respect to durability (i.e. resistance to leaching). Since the boric acid or sodium hydroxide is relatively less durable, to compensate for this, additional glass material could be directed from the hopper 42 by means of the screw conveyor 44 and deposited through the opening 38 into the molten glass material 72 to become a part thereof. This would insure that the total composition would have a sufficiently high percentage of the more durable material to make the total end product sufficiently durable.

To proceed to a description of another facet of the present invention, the carbon particles which are oxidized in the combustion area are in some instances subjected to a phenomenon which can be called "carbon-smoke scintillation." When the suspended carbon particles reach an adequately high temperature (approximately 1600° F.) the suspended carbon particles suddenly begin to glow brightly from self-heating. With the particles being relatively small, combustion proceeds quite rapidly, and for a short period the carbon particles reach a temperature which is believed to be substantially in excess of the ambient temperature, and possibly as high as 2600° F.

With regard to insuring that there is substantially complete combustion in the conversion chamber 24, it should be indicated that in the present invention, there is not complete dependency upon heat generated by combustion to maintain the temperature in the chamber 24 at the desired level. In some instances, the combustible waste material may be such that the heat of combustion is sufficient so that additional heat need not be provided to carry out the process. However, in many situations, it will be necessary to heat the glass bath 72 by the Joule effect to maintain the desired temperature in the conversion chamber 24. Thus, even though the combustible material does not constitute a great proportion of the waste material, it is possible in the present invention to cause substantially complete conversion of all the waste material, whether combustible or not, to the harmless or relatively less hazardous form.

Within the broader aspects of the present invention, it should also be recognized that the process of the present invention could be carried on with waste material which has substantially no combustible material therein. In these circumstances, the present invention would be particularly useful where the material is such that upon heating it breaks off into small particles. This could occur in certain inorganic materials such as limestone, or possibly materials containing water. In these circumstances, the particulate material would have the opportunity in the conversion chamber 24 to descend slowly onto the molten glass to become a part of the molten glass 72 so as to be captured in the end product.

Figure 2:
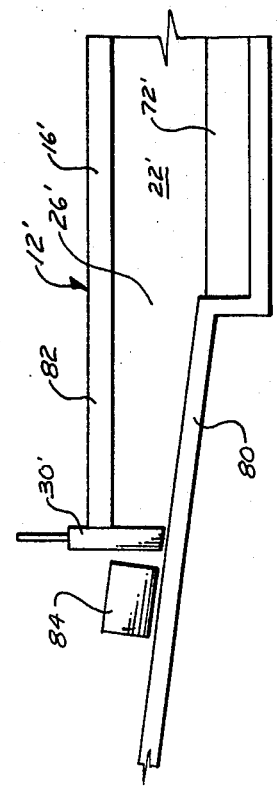
FIG. 2 is a view similar to FIG. 1 of an inlet portion of a second embodiment of the present invention.

A second embodiment of the present invention is illustrated in FIG. 2. In this second embodiment, only the rear feed portion of the apparatus is different from the first embodiment, so only the rear portion of the apparatus will be shown in FIG. 2. Those components of the second embodiment which are similar to those of the first embodiment will be given like numerical designations, with a prime (') designation distinquishing those of the second embodiment.

By way of background information for this second embodiment, let it be assumed that the waste material contains a portion of metal, such as iron which melts at approximately 2795° F. This could occur, for example, where combustible waste material is contained in a metal drum and it is desired to feed the metal drum into the conversion chamber 24. In the second embodiment, there is provided a pre-combustion area where oxidation can take place before the waste material is introduced onto the molten glass material.

In this second embodiment, there is a containing structure 12', having a rear waste inlet opening 26'. Extending rearwardly from the opening 26' is a platform 80 located moderately above the upper level of the molten glass 72. This platform 80 has an enclosing structure 82, which can be considered as rearward extensions of the top wall 16' and side walls 22'. The door 30' is not positioned immediately adjacent the opening 26', but is positioned rearwardly of the platform 80. The feed chute 28' is positioned rearwardly of the door 30'.

In operation, let it be assumed that there is a metal drum 84 containing combustible waste material. The metal drum 84 is placed on the feed chute 28', the door 30' is opened, and the metal drum 84 is pushed onto the platform 80. Since the temperature in the conversion chamber is approximately 2300° F., the metal drum (made of iron or steel) will not melt, but will readily oxidize at that temperature. Thus, the metal material will soon become reduced to a metallic oxide and remain deposited on the platform 80. When the metal has been substantially completely reduced to metal oxide, the door 30' can again be opened, and the pusher arm 74 can be utilized to move the waste material through opening 26' and onto the surface of the molten glass 72'. Or the material which becomes molten will flow downwardly onto the molten glass surface. The metal oxide that is formed is compatible with the glass material 72', and readily becomes a part thereof. In other respects, the second embodiment is substantially the same as the first embodiment, so the remaining apparatus of the second embodiment (i.e. the discharge portion thereof) will not be described herein.

What is claimed is:

1. A method for converting potentially harmful waste material to a less potentially harmful condition, said method comprising:
   a. providing a glass material in an enclosed horizontally extending conversion chamber, said chamber comprising a rear breakdown area and a forward settling area spaced horizontally from the breakdown area, and maintaining said glass material in a molten condition in a lower portion of said chamber,
   b. directing said waste material into said conversion chamber at a location proximate said glass material at said breakdown area,
   c. maintaining said glass material at a sufficiently high temperature to cause the waste material to be broken down into an ash component and a gaseous component, with at least some of the ash component being particulate ash suspended in said gaseous component,
   d. moving said gaseous component generally horizontally from said breakdown area to a location over said molten glass material in said settling area, with at least part of said suspended particulate ash settling onto the molten glass material in the settling area to form a combined ash-glass material, e. discharging said combined ash-glass material to a cooling zone to form said waste-glass material into a solid waste-glass product.

2. The method as recited in claim 1, wherein at least a portion of said waste material is combustible, said method further comprising maintaining said glass material at a sufficiently high temperature and providing sufficient oxidizing gas to cause combustion of said combustible waste material.

3. The method as recited in claim 1, wherein at least a portion of said waste material is metallic, said method further comprising providing an initial combustion area spaced from said breakdown area, directing at least said metallic portion of the waste material into said initial combustion area, oxidizing said metallic portion to metal oxides, and directing said metal oxides onto said molten glass material.

4. The method as recited in claim 1, wherein
a. at least a portion of said waste material is combustible, said method further comprising maintaining said glass material at a sufficiently high temperature and providing sufficient oxidizing gas to cause combustion of said combustible waste material to form at least a portion of said ash product,
b. at least a portion of said waste material is metallic, said method further comprising providing an initial combustion area spaced from said breakdown area, directing at least said metallic portion of the waste into said initial combustion area, oxidizing said metallic portion to metal oxides, and directing said metal oxides onto said molten glass material.

5. The method as recited in claim 1, further comprising directing said gaseous component from said settling area through at least one filter component made of a filter material which can be combined with said glass material, capturing at least some of said suspended particulate ash in said filter component, then discharging said filter component into said molten glass material so that said filter component with said particulate ash becomes incorporated in said glass material.

6. The method as recited in claim 1, further comprising directing said gaseous component from said settling area through at least one filter component made of a filter material which is at least partly combustible, capturing at least some of said suspended particulate ash in said filter component, then discharging said filter component into said molten glass material so that said particulate ash becomes incorporated in said glass material.

7. The method as recited in claim 5 or 6, further comprising providing a plurality of filter components arranged in series with one another and directing said gaseous component from said settling area through said filter components, said method further comprising discharging said filter components sequentially into said glass material so that particulate ash in the filter component becomes incorporated in said glass material.

8. The method as recited in claim 1, wherein said glass material is heated by passing electric current therethrough.

9. The method as recited in claim 1, wherein
a. at least a portion of said waste material is combustible, said method further comprising maintaining said glass material at a sufficiently high temperature and providing sufficient oxidizing gas to cause combustion of said combustible waste material to form at least a portion of said ash product.
b. at least a portion of said waste material is metallic, said method further comprising providing an initial combustion area spaced from said breakdown area, directing at least said metallic portion of the waste material into said initial combustion area, oxidizing said metallic portion to metal oxides, and directing said metal oxides onto said molten glass material,
c. further comprising providing a plurality of filter components arranged in series with one another and directing said gaseous component from said settling area through said filter components, said method further comprising discharging said filter components sequentially into said glass material so that said filter components with particulate ash therein become incorporated in said glass material.

10. A method for converting waste material to a relatively harmless condition, said method comprising:
a. directing a glass material into an enclosed conversion chamber and maintaining said glass material in a molten condition in said chamber
b. directing said waste material onto said glass material in the conversion chamber
c. maintaining said glass material at a sufficiently high temperature to cause said material to be broken down into an ash component and a gaseous component, with at least some of said ash component being particulate ash suspended in said gaseous component,
d. moving said gaseous component through at least one filter component comprising a material which can be combined with said glass material,
e. capturing at least some of said particulate ash in said filter component,
f. then moving said filter component into said glass component so that said filter component with the particular ash contained therein becomes incorporated in said glass material, so that there is a combined ash-glass material,
g. discharging said combined ash-glass material to a cooling zone to form said ash-glass material into a solid waste glass product.

11. The method as recited in claim 10, further comprising providing a plurality of filter components arranged in series with one another and directing said gaseous component from said settling area through said filter components, said method further comprising discharging said filter components sequentially into said glass material so that at least a portion of said filter components with particulate ash therein become incorporated in said glass material.

12. An apparatus for converting waste material to a relatively harmless condition, said apparatus comprising:
a. means defining an enclosed horizontally extending conversion chamber, said chamber having a rear breakdown area and a forward settling area spaced horizontally from the breakdown area, said chamber further having a lower elongate portion adapted to contain a molten glass material, and an upper portion adapted to contain a gaseous component,
b. rear inlet means leading into the breakdown area, said inlet means adapted to direct said waste material and said glass material into said conversion chamber c. forward discharge means adapted to discharge a combined ash-glass material from said settling area, d. means to discharge said gaseous component from said settling area e. means to maintain said glass material in said conversion chamber at an adequately high temperature to cause breakdown of waste material in said breakdown area, whereby when the hazarous waste material is directed onto the molten glass material in the breakdown area, the waste material is broken down into an ash component and a gaseous component, with at least some of the ash component being particulate ash suspended in the gaseous component, and said gaseous component moves over said settling area with at least part of suspended particulate ash settling onto the molten glass in the settling area to form the combined ash-glass material which can then be discharged from the settling area to a cooling zone to form a solid waste-glass product.

13. The apparatus as recited in claim 12, further comprising means defining an initial combustion area spaced from the breakdown area, said initial combustion area being adapted to receive a metallic portion of the waste material, and adapted to maintain said metallic portion at a sufficiently high temperature to cause oxidation of the metallic portion, said initial combustion area leading into said breakdown area so that metal oxides formed from said metallic portion can be directed onto said molten glass material in the breakdown area.

14. The apparatus as recited in claim 12, further comprising means defining a gaseous discharge passageway leading from said settling area, at least one filter component positioned in said gaseous discharge passageway, said filter component comprising a filter material which can be combined with the glass material, means to discharge said filter component into the molten glass material so that the filter component with particulate ash being captured therein can be incorporated in said glass material.

15. The apparatus as recited in claim 12, further comprising means defining a gaseous discharge passageway leading from said settling area, at least one filter component positioned in said gaseous discharge passageway, said filter component comprising a filter material which is at least partly combustible, means to discharge said filter component into the molten glass material so that particulate ash being captured therein can be incorporated in said glass material.

16. The apparatus as recited in claim 14 or 15, further comprising a plurality of filter components arranged in series in the gas discharge passageway, said discharge means being adapted to discharge said filter components sequentially into said glass material.

17. An apparatus for converting waste material to a relatively harmless condition, said apparatus comprising:

a. means defining an enclosed conversion chamber, said chamber having a lower portion adapted to contain a molten glass material, and an upper portion adapted to contain a gaseous component, b. inlet means leading into said conversion chamber and adapted to direct the waste material and glass material into the conversion chamber, c. discharge means adapted to discharge a combined ash-glass material from the conversion chamber d. means defining a discharge passageway for said gaseous component, e. means to maintain said glass material in the conversion chamber at an adequately high temperature to cause breakdown of waste material in the conversion chamber f. at least one filter component positioned in said discharge passageway, said filter component comprising a filter material which can be combined with the glass material, g. means to discharge the filter component into the glass material so that the filter component with particulate ash being captured therein can be incorporated in the glass material.

18. The apparatus as recited in claim 17, wherein there is a plurality of filter components arranged in series in the discharge passageway, with said discharge means being adapted to discharge said filter components sequentially into the glass material.

19. An apparatus for converting waste material to a relatively harmless condition, said apparatus comprising:

a. means defining an enclosed conversion chamber, said chamber having a lower portion adapted to contain a molten glass material, and an upper portion adapted to contain a gaseous component, b. inlet means leading into said conversion chamber and adapted to direct the waste material and glass material into the conversion chamber, c. discharge means adapted to discharge a combined ash-glass material from the conversion chamber, d. means defining a discharge passageway for said gaseous component, e. means to maintain said glass material in the conversion chamber at an adequately high temperature to cause breakdown of waste material in the conversion chamber, f. at least one filter component positioned in said discharge passageway, said filter component comprising a filter material which is combustible, g. means to discharge the filter component into the glass material so that particulate ash being captured therein can be incorporated in the glass material.

20. The apparatus as recited in claim 19, wherein there is a plurality of filter components arranged in series in the discharge passageway, with said discharge means being adapted to discharge said filter components sequentially into the glass material.

* * * * *